(12) United States Patent
Wang (10) Patent No.: US 7,107,941 B2
(45) Date of Patent: Sep. 19, 2006

(54) SAFETY DEVICE OF COLLAR FOR PET

(75) Inventor: Chih-Hsin Wang, Taichung Hsien (TW)

(73) Assignee: Pei-Wen Chen, Taichung Hsien (TW)

( * ) Notice: Subject to any disclaimer, the term of this patent is extended or adjusted under 35 U.S.C. 154(b) by 0 days.

(21) Appl. No.: 10/751,294

(22) Filed: Jan. 2, 2004

(65) Prior Publication Data

US 2005/0145203 A1 Jul. 7, 2005

(51) Int. Cl.
*A62B 35/00* (2006.01)
(52) U.S. Cl. .................................... 119/865
(58) Field of Classification Search ............. 119/865, 119/856, 863, 864; 24/163 R, 182, 302, 24/308, 335, 336, 578.15, 573.09, 579.09, 24/615, 115 F, 310, 312, 313, 602, 681, 168, 24/170, 188, 191; 403/300, 305, 311, 381; 59/79.1, 85
See application file for complete search history.

(56) References Cited

U.S. PATENT DOCUMENTS

| 7,233 | A | * | 4/1850 | Gibbons ............... 416/132 R |
|---|---|---|---|---|
| 1,420,790 | A | * | 6/1922 | Varney ................... 403/391 |
| 1,447,967 | A | * | 3/1923 | Davis ........................ 24/311 |
| 2,097,070 | A | * | 10/1937 | Lago ........................ 119/858 |
| 2,346,946 | A | * | 4/1944 | Schacht .................... 119/858 |
| D140,270 | S | * | 2/1945 | Sharp ....................... D2/627 |
| 2,464,867 | A | * | 3/1949 | Johnson .................... 119/863 |
| 2,612,139 | A | * | 9/1952 | Collins ..................... 119/865 |
| 2,712,167 | A | * | 7/1955 | Blanchard .................. 24/569 |
| 3,006,322 | A | * | 10/1961 | Vitol et al. ................ 119/863 |
| 4,020,795 | A | * | 5/1977 | Marks ....................... 119/654 |
| 4,044,725 | A | * | 8/1977 | Miller ....................... 119/865 |
| D253,501 | S | * | 11/1979 | Hoch ....................... D11/210 |
| 4,309,797 | A | * | 1/1982 | Schrougham et al. ......... 24/307 |
| D285,625 | S | * | 9/1986 | Kirk ........................ D11/208 |
| 4,776,454 | A | * | 10/1988 | Momose .................... 198/853 |
| 4,881,492 | A | * | 11/1989 | Jones ....................... 119/865 |
| 5,027,477 | A | * | 7/1991 | Seron ........................ 24/3.4 |
| 5,092,018 | A | * | 3/1992 | Seron ........................ 24/3.4 |
| 5,195,217 | A | * | 3/1993 | Arntzen .................... 24/115 F |
| 5,408,220 | A | * | 4/1995 | Brown et al. ............... 340/571 |
| 5,564,131 | A | * | 10/1996 | Anscher ..................... 2/340 |
| 5,675,875 | A | * | 10/1997 | Servatius .................. 24/704.1 |
| 5,987,709 | A | * | 11/1999 | Chou ........................ 24/116 A |
| 6,073,317 | A | * | 6/2000 | Barison .................... 24/115 F |
| 6,308,663 | B1 | * | 10/2001 | Philen et al. ............... 119/864 |
| 6,360,404 | B1 | * | 3/2002 | Mudge et al. ................ 24/3.4 |
| 6,408,493 | B1 | * | 6/2002 | Yurman et al. ............. 24/600.4 |
| 6,438,807 | B1 | * | 8/2002 | Ptolemy ..................... 24/484 |
| 6,606,967 | B1 | * | 8/2003 | Wolfe et al. ............... 119/856 |
| 6,682,249 | B1 | * | 1/2004 | Rietz ......................... 403/2 |

\* cited by examiner

*Primary Examiner*—Peter M. Poon
*Assistant Examiner*—David J. Parsley
(74) *Attorney, Agent, or Firm*—Alan D. Kamrath; Nikolai & Mersereau, P.A.

(57) ABSTRACT

A safety device is disclosed for use with a collar for a pet. The safety device includes a central member, a first lateral member and a second lateral member. The first lateral member is for pivotal and releasable engagement with the central member. The second lateral member is for pivotal and releasable engagement with the central member.

11 Claims, 9 Drawing Sheets

SAFETY DEVICE OF COLLAR FOR PET

FIELD OF INVENTION

The present invention relates to a safety device of a collar for a pet.

BACKGROUND OF INVENTION

Figure 8:
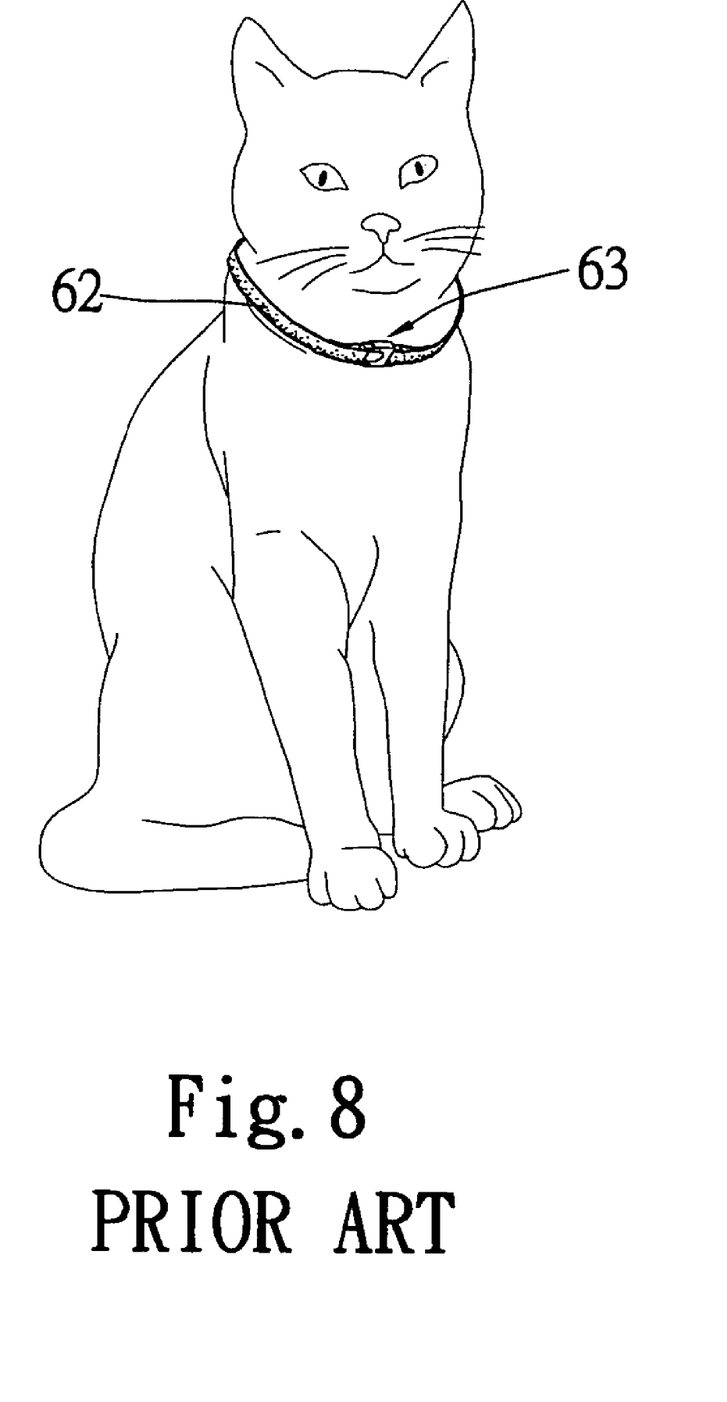
FIG. 8 is a perspective view of a cat wearing a collar equipped with a conventional safety device.
Figure 9:
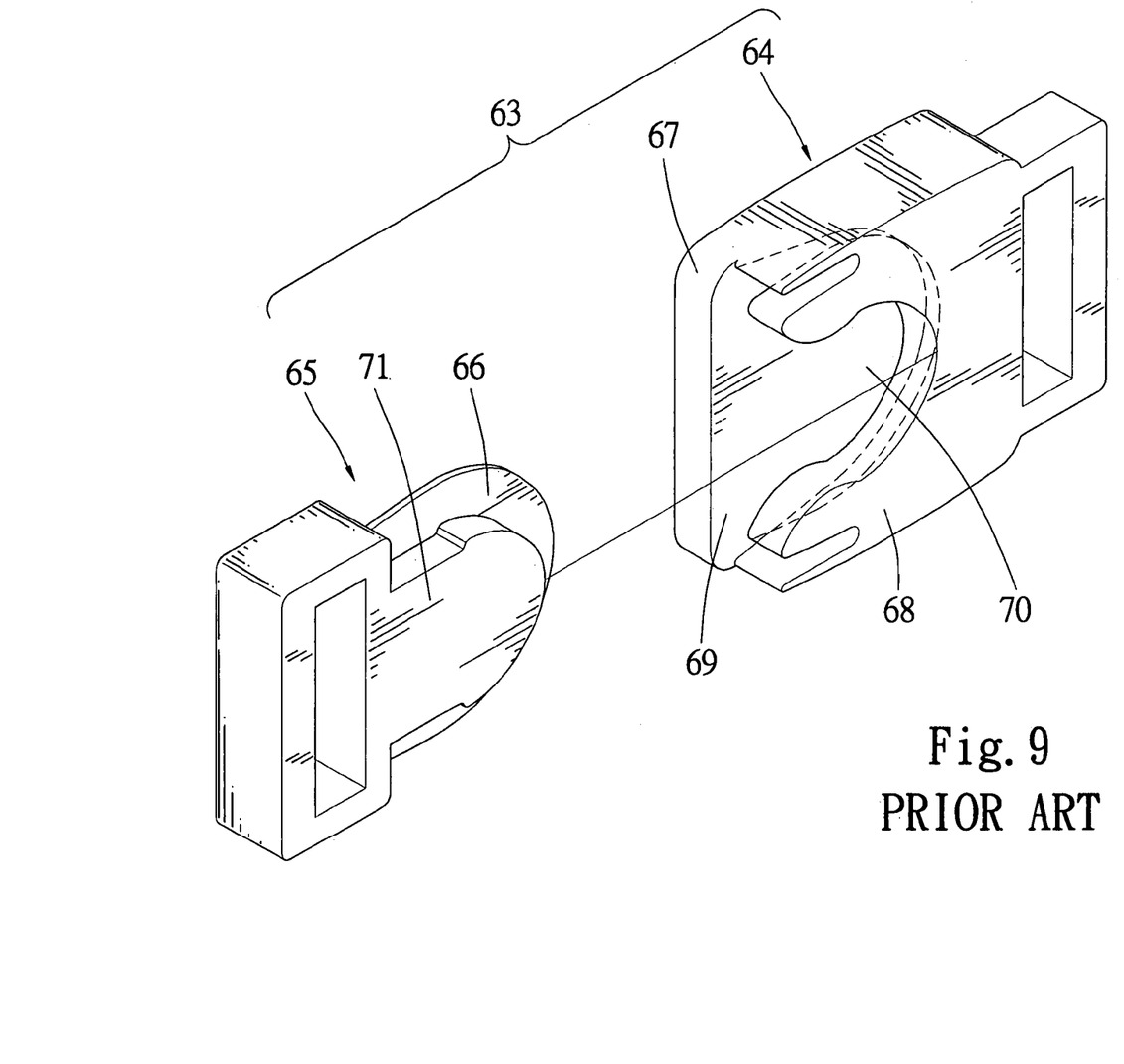
FIG. 9 is an exploded view of the safety device of FIG. 8.

Referring to FIG. 8, a cat wears a collar 62 with a conventional safety device 63. Referring to FIG. 9, the conventional safety device 63 is configured like a buckle of a waist belt. The conventional safety device 63 includes a female member 64 and a male member 65. The female member 64 includes a first plate 67 and a second plate 68. A space 69 is defined between the plates 67 and 68. The second plate 68 defines a recess 70 with a reduced open end. The male member 65 includes a plate 71 and a mushroom-shaped portion 66 formed on the plate 71. To engage the male member 65 with the female member 64, the plate 71 and the mushroom-shaped portion 66 are inserted into the space 69 and the recess 70, respectively. In case that the collar 62 is entangled with a branch of a tree for example, the male member 65 is supposed to be disengaged from the female member 64 in order to prevent the collar 62 from strangling the cat. However, several problems are encountered in the use of the conventional safety device 63. Firstly, unless the conventional safety device 63 is subject to a force that is oriented precisely and large enough, the male member 65 cannot be disengaged from the female member 64. Moreover, the male member 65 cannot be pivoted relative to the female member 64 in compliance with the neck of the cat. Thus, the cat feels uncomfortable wearing the collar 62 with the safety device 63.

Therefore, the present invention is intended to obviate or at least alleviate the problems encountered in the prior art.

SUMMARY OF INVENTION

It is an objective of the present invention to provide a pet's collar with a safety device that works whenever it is subject to a sufficiently large force regardless of the direction of the force.

It is another objective of the present invention to provide a pet's collar with a safety device that provides a smooth feel for a pet.

According to the present invention, a safety device is disclosed for use with a collar for a pet. The safety device includes a central member, a first lateral member and a second lateral member. The first lateral member is for pivotal and releasable engagement with the central member. The second lateral member is for pivotal and releasable engagement with the central member.

Other objectives, advantages and novel features of the invention will become more apparent from the following detailed description in conjunction with the attached drawings.

BRIEF DESCRIPTION OF DRAWINGS

The present invention will be described via detailed illustration of embodiments referring to the drawings.

DETAILED DESCRIPTION OF EMBODIMENTS

Figure 1:
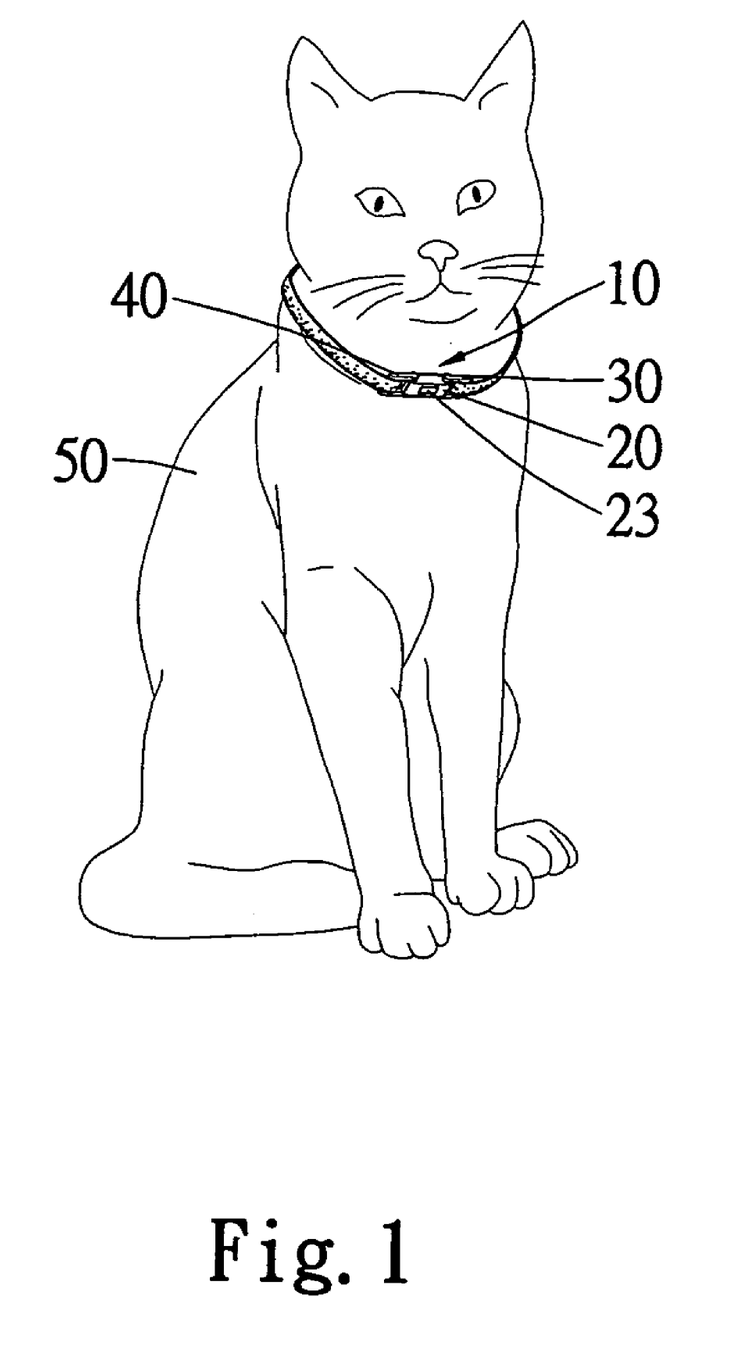
FIG. 1 is a perspective view of a cat wearing a collar equipped with a safety device according to a first embodiment of the present invention.

Referring to FIG. 1, a cat 50 wears a collar (not numbered) equipped with a safety device 10 according to a first embodiment of the present invention.

Figure 2:
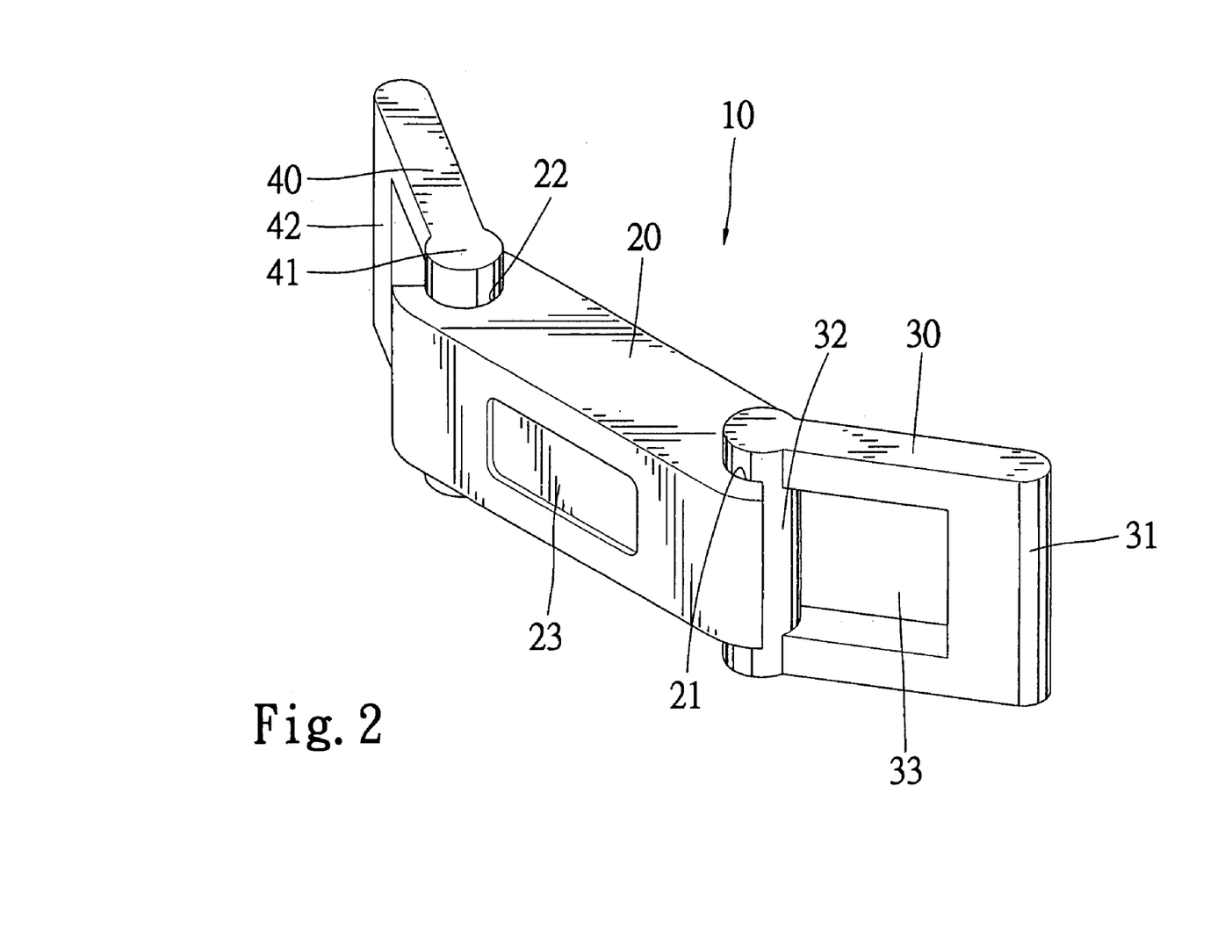
FIG. 2 is a perspective view of the safety device of FIG. 1.

Referring to FIG. 2, the safety device 10 includes a female member 20, a first male member 30 for pivotal and releasable engagement with the female member 20 and a second male member 40 for pivotal and releasable engagement with the female member 20.

Figure 3:
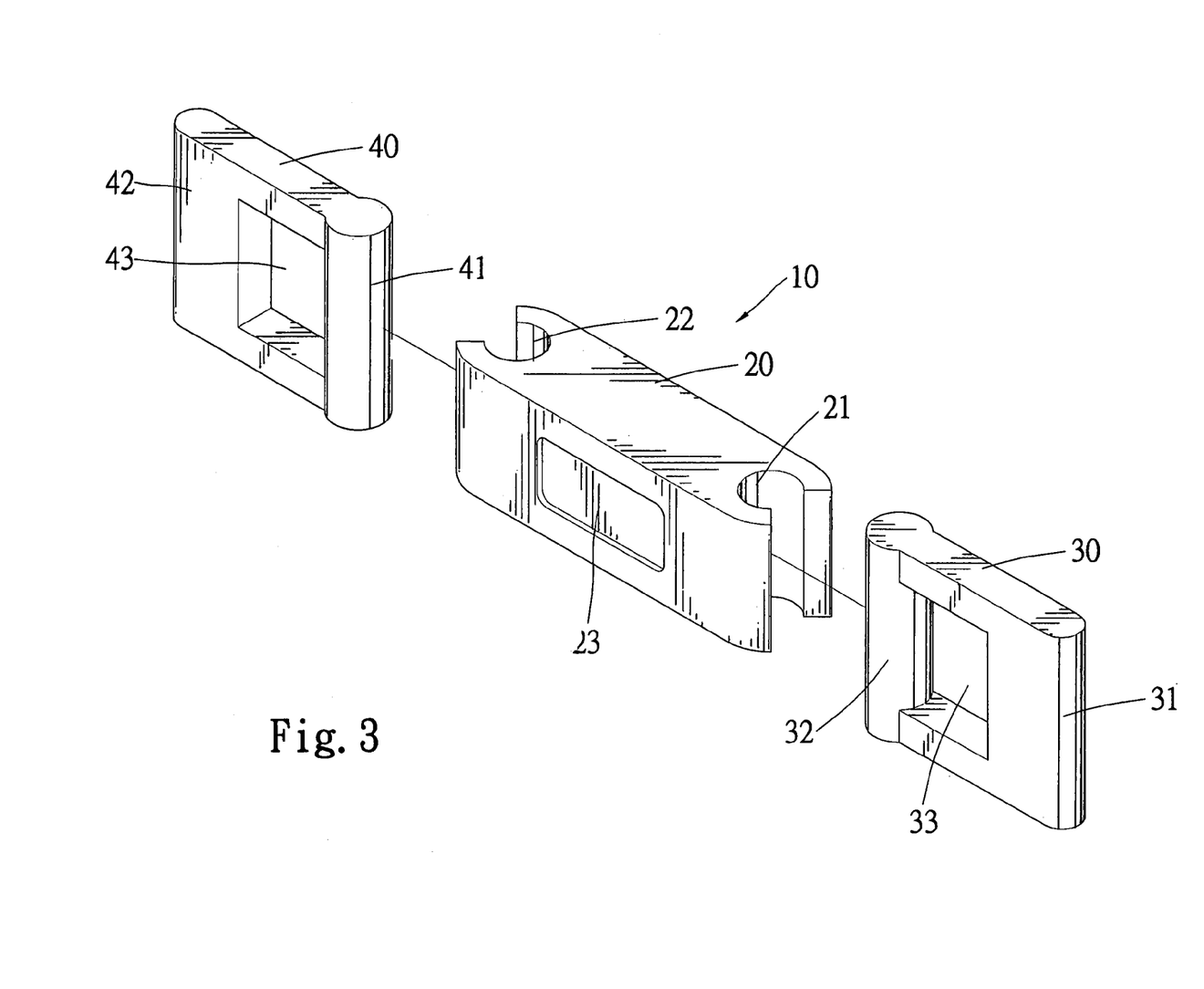
FIG. 3 is an exploded view of the safety device of FIG. 2.

Referring to FIG. 3, the female member 20 includes a first recess 21 defined in an end, a second recess 22 defined in an opposite end and a cavity 23 defined in the front side. The first recess 21 and the second recess 22 both include a reduced opening. The cavity 23 can receive a nametag (not shown) of the pet.

The first male member 30 includes a bar 31 formed at an end, a cylinder 32 formed at an opposite end and hole 33 defined therein between the bar 31 and the cylinder 32.

The second male member 40 includes a bar 42 formed at an end, a cylinder 41 formed at an opposite end and hole 43 defined therein between the bar 42 and the cylinder 41.

In use, an end of the collar is inserted through the hole 33 in order to wrap the bar 31, and an opposite end of the collar is inserted through the hole 43 in order to wrap the bar 42. The cylinder 32 is forced into the first recess 21 through the reduced opening. The reduced opening of the first recess 21 keeps the cylinder 32 in the first recess 21. The cylinder 42 is forced into the second recess 22 through the reduced opening. The reduced opening of the second recess 22 keeps the cylinder 41 in the second recess 22.

Figure 4:
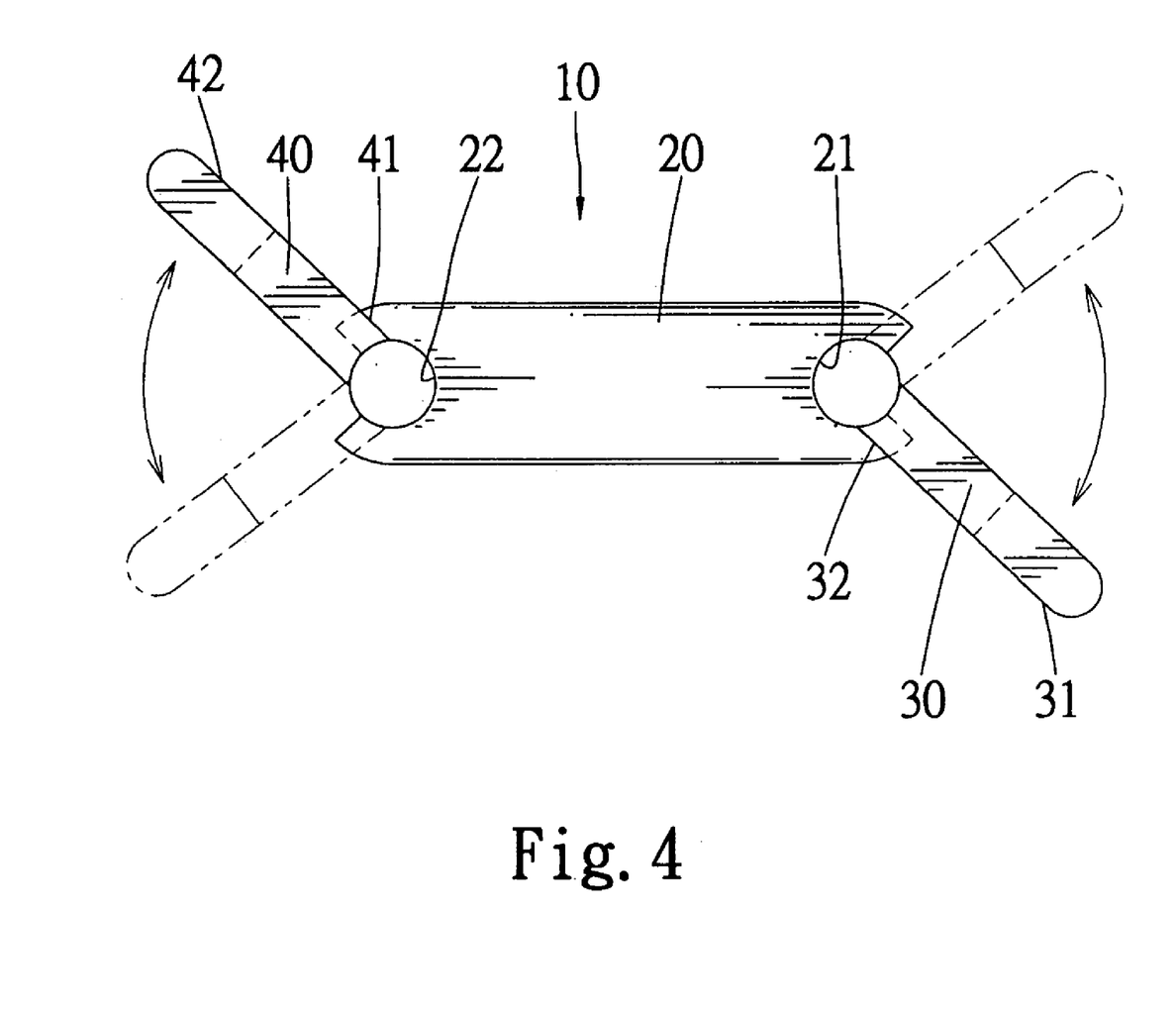
FIG. 4 is a top view of the safety device of FIG. 2.

Referring to FIG. 4, the male members 30 and 40 can, independent of each other, be pivoted relative to the female member 20 compliant with the neck of the cat. Thus, the cat feels comfortable wearing the collar equipped with the safety device 10.

Figure 5:
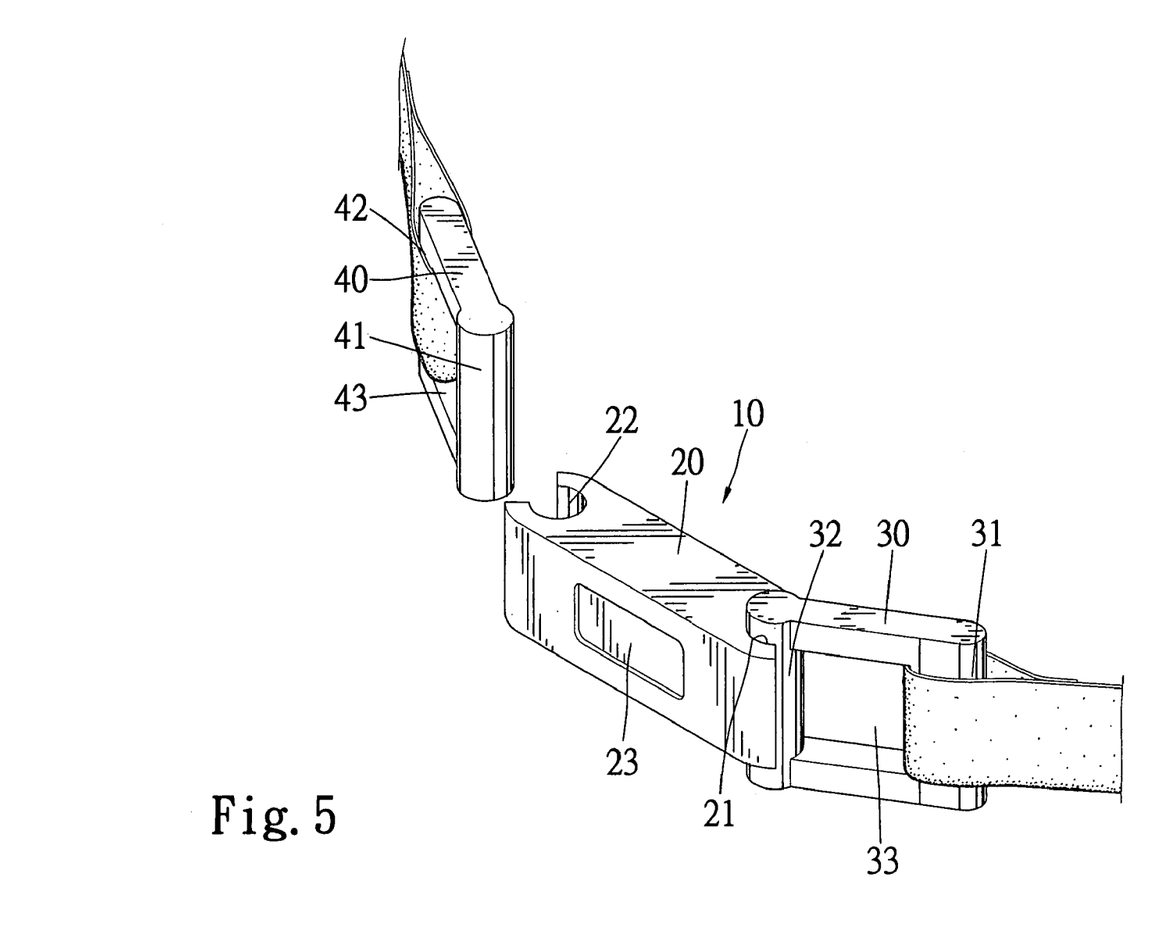
FIG. 5 is similar to FIG. 2 but shows the safety device in another position.
Figure 6:
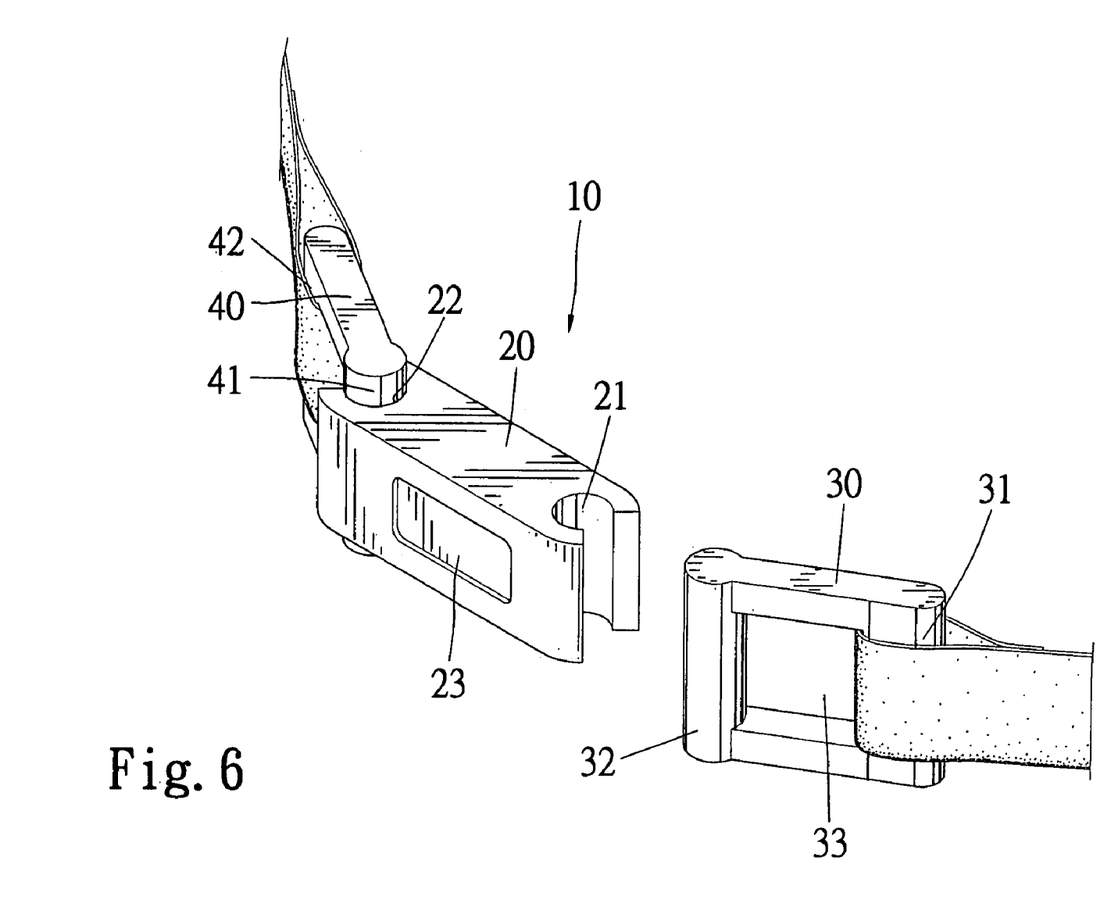
FIG. 6 is similar to FIG. 5 but shows the safety device in another position.

Referring to FIGS. 5 and 6, the male members 30 and 40 can, independent of each other, be disengaged from the female member 20 in case that the collar is entangled with a branch of a tree in order to keep the collar from strangling the cat. As the male members 30 and 40 are both pivotal relative to the female member 20, almost any force that is exerted on the safety device 10 is automatically oriented adequately by the safety device 10. Therefore, the force disengages the first male member 30 and/or the second male member 40 from the female member 20 as long as the force is large enough.

Figure 7:
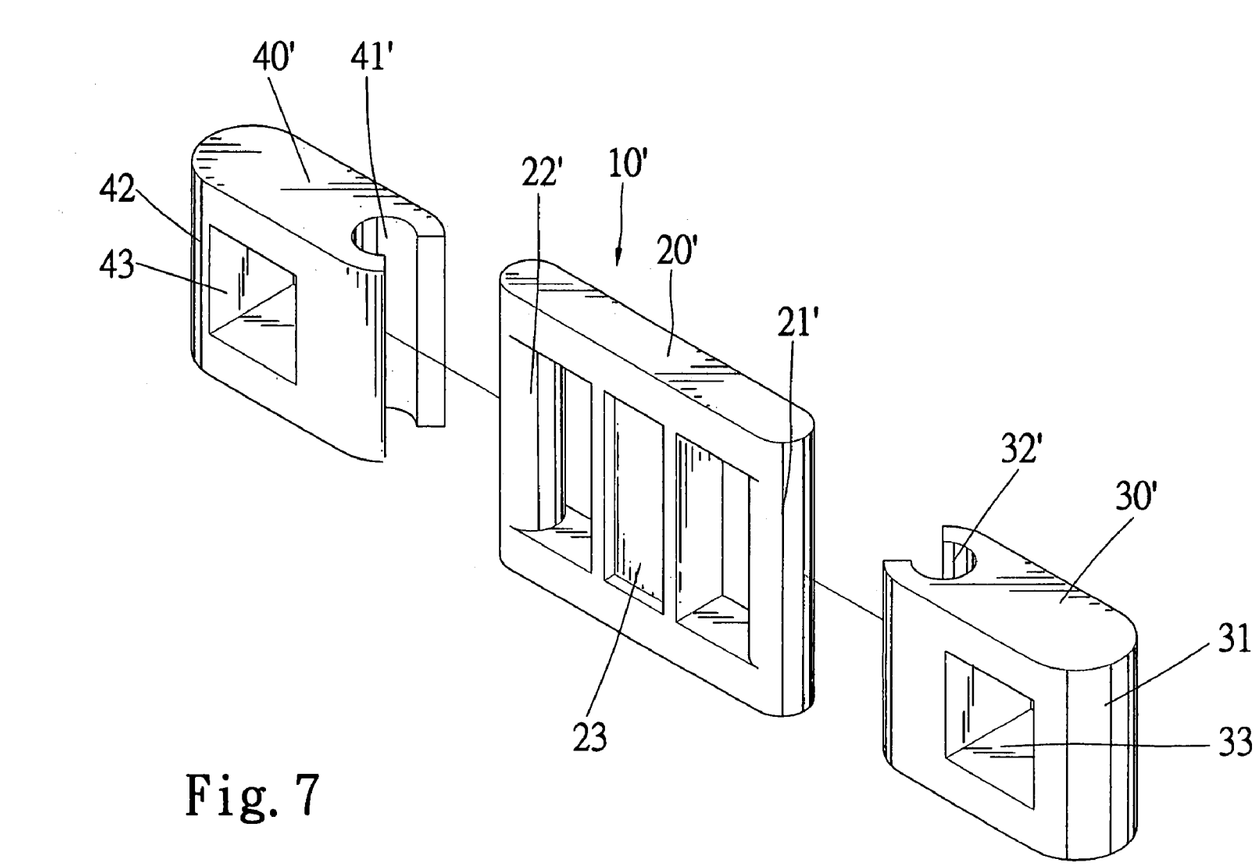
FIG. 7 is an exploded view of a safety device according to a second embodiment of the present invention.

FIG. 7 shows a safety device 10' according to a second embodiment of the present invention. The safety device 10' includes a male member 20', a first female member 30' and a second female member 40'. The male member 20' includes a first cylinder 21' formed at an end and a second cylinder 22' formed at an opposite end. Like the female member 20, the male member 20' defines a cavity 23 for receiving a nametag (not shown). The first female member 30' is similar to the first male member 30 except for including a recess 32' instead of the cylinder 32. The second female member 40' is similar to the second male member 40 except for including a recess 41' instead of the cylinder 41.

The present invention has been described via detailed illustration of two embodiments. Those skilled in the art can derive variations from the embodiments without departing from the scope of the present invention. Therefore, the embodiments shall not limit the scope of the present invention defined in the claims.

The invention claimed is:

1. A safety device for a pet comprising a collar, a central member, a first lateral member for pivotal and releasable engagement with the central member and a second lateral member for pivotal and releasable engagement with the central member, wherein the central member is a male member while the lateral members are female members, wherein the male member includes a first cylinder formed at an end and a second cylinder formed at an opposite end, with the first and second cylinders each having an axis and a first side and a second side spaced along the axis from the first side, and the first female member defines a first recess into which the first cylinder can be forced in a direction perpendicular to the axis of the first cylinder without disassembly of either of the central member and the first lateral member and in which the first cylinder can be pivoted about the axis of the first cylinder, and the second female member defines a second recess into which the second cylinder can be forced in a direction perpendicular to the axis of the second cylinder without disassembly of either of the central member and the second lateral member and in which the second cylinder can be pivoted about the axis of the second cylinder, with the first and second cylinders having cross sections at the first and second sides of a same shape and size, wherein the first female member includes a bar located opposite to the first recess thereof and spaced from the first recess in a direction perpendicular to the axis, with the bar wound with an end of the collar.

2. The safety device according to claim 1 wherein the first recess includes a reduced opening so as to keep the first cylinder therein.

3. The safety device according to claim 1 wherein the second recess includes a reduced opening so as to keep the second cylinder therein.

4. The safety device according to claim 1 with the first and second cylinders having cross sections of a constant shape and size between the first and second sides.

5. The safety device according to claim 4 with the first and second cylinders terminating in the first and second sides.

6. The safety device according to claim 1 wherein the first recess of the first female member has a length parallel to the axis of the first cylinder, with the male member including a passage spaced inwardly of the first cylinder and having a length parallel to the axis of the first cylinder generally equal to the length of the first recess for pivotally receiving the first female member and the first recess of the first female member therein, wherein the second recess of the second female member has a length parallel to the axis of the second cylinder, with the male member including a passage spaced inwardly of the second cylinder and having a length parallel to the axis of the second cylinder generally equal to the length of the second recess for pivotally receiving the second female member and the second recess of the second female member therein.

7. The safety device according to claim 1 wherein the first cylinder is pivotal about the axis in the first recess and the second cylinder is pivotal about the axis in the second recess.

8. A safety device for a pet comprising a collar, a central member, a first lateral member for pivotal and releasable engagement with the central member and a second lateral member for pivotal and releasable engagement with the central member, wherein the central member is a male member while the lateral members are female members, wherein the male member includes a first cylinder formed at an end and a second cylinder formed at an opposite end, with the first and second cylinders each having an axis and a first side and a second side spaced along the axis from the first side, and the first female member defines a first recess into which the first cylinder can be forced in a direction perpendicular to the axis of the first cylinder without disassembly of either of the central member and the first lateral member and in which the first cylinder can be pivoted about the axis of the first cylinder, and the second female member defines a second recess into which the second cylinder can be forced in a direction perpendicular to the axis of the second cylinder without disassembly of either of the central member and the second lateral member and in which the second cylinder can be pivoted about the axis of the second cylinder, with the first and second cylinders having cross sections at the first and second sides of a same shape and size, wherein the second female member includes a bar located opposite to the second recess thereof and spaced from the second recess in a direction perpendicular to the axis, with the bar wound with an end of the collar.

9. The safety device according to claim 8 with the first and second cylinders each having cross sections of a constant shape and size between the first and second sides.

10. The safety device according to claim 9 with the first and second cylinders each terminating in the first and second sides.

11. A safety device for a pet comprising a collar, a central member, a first lateral member for pivotal and releasable engagement with the central member and a second lateral member for pivotal and releasable engagement with the central member, wherein the central member is a male member while the lateral members are female members, wherein the male member includes a first cylinder formed at an end and a second cylinder formed at an opposite end, with the first and second cylinders each having an axis and a first side and a second side spaced along the axis from the first side, and the first female member defines a first recess into which the first cylinder can be forced in a direction perpendicular to the axis of the first cylinder without disassembly of either of the central member and the first lateral member and in which the first cylinder can be pivoted about the axis of the first cylinder, and the second female member defines a second recess into which the second cylinder can be forced in a direction perpendicular to the axis of the second cylinder without disassembly of either of the central member and the second lateral member and in which the second cylinder can be pivoted about the axis of the second cylinder, with the first and second cylinders having cross sections at the first and second sides of a same shape and size, with the first and second cylinders having cross sections of a constant shape and size between the first and second sides, with the first and second cylinders terminating in the first and second sides, wherein the first recess of the first female member includes a reduced opening extending parallel to and spaced from the axis so as to keep the first cylinder therein, wherein the first lateral member further comprises a third cylinder having an axis parallel to and spaced from the first recess, with the reduced opening of the first recess extending in a direction from the first recess opposite to the third cylinder, with the third cylinder wound by an end of the collar, wherein the second recess of the second female member includes a reduced opening extending parallel to and spaced from the axis so as to keep the second cylinder therein, wherein the second lateral member further comprises a fourth cylinder having an axis parallel to and spaced from the second recess, with the reduced opening of the second recess extending in a direction from the second recess opposite to the fourth cylinder, with the fourth cylinder wound by an end of the collar.

* * * * *